United States Patent [19]

Lange et al.

[11] 4,234,954

[45] Nov. 18, 1980

[54] ON-LINE BIT ERROR RATE ESTIMATOR

[75] Inventors: Julius Lange, Sunnyvale; Gary L. Wagner, Menlo Park, both of Calif.

[73] Assignee: Ford Aerospace & Communications Corp., Detroit, Mich.

[21] Appl. No.: 6,054

[22] Filed: Jan. 24, 1979

[51] Int. Cl.³ ...................... H03K 13/32; G06F 11/00
[52] U.S. Cl. ........................................ 371/6; 307/358; 361/91; 375/99
[58] Field of Search .............. 340/146.1 AX, 146.1 R; 325/42, 323; 307/351, 358; 371/6; 361/91; 375/34, 99

[56] References Cited

U.S. PATENT DOCUMENTS

| | | | |
|---|---|---|---|
| 3,204,189 | 8/1965 | Trautwein | 328/120 |
| 3,214,700 | 10/1965 | Hook | 328/165 |
| 3,248,695 | 4/1966 | Dascotte | 340/146.1 R |
| 3,721,959 | 3/1973 | George | 340/146.1 A X |
| 3,757,296 | 9/1973 | Gibson | 340/146.1 R |
| 3,999,083 | 12/1976 | Bumgardner | 307/358 |
| 4,034,340 | 7/1977 | Sant'Agostino | 340/146.1 A X |
| 4,137,556 | 1/1979 | Sessa | 305/358 |
| 4,156,202 | 5/1979 | Takahashi | 307/358 |

*Primary Examiner*—Charles E. Atkinson
*Attorney, Agent, or Firm*—Edward J. Radlo; Clifford L. Sadler

[57] ABSTRACT

This on-line circuit estimates the bit error rate (BER) of a binary data signal stream in the presence of noise uncorrelated with the signal. For a binary data signal having two states, e.g., plus V and minus V biased around a specified reference level (REF), the circuit counts the number of instances in which the received signal deviates more than 2V from the reference level. This accumulated count gives an accurate estimate of the BER over several orders of magnitude variation of the BER. One embodiment counts just the deviations in a positive direction. This circuit functions independently of any bit pattern and can be used for on-line monitoring without decreasing the information carrying capability of the link. The time required to accumulate a statistically significant sample is the same as for a direct comparison between sent and received bits.

16 Claims, 2 Drawing Figures

ON-LINE BIT ERROR RATE ESTIMATOR

BACKGROUND OF THE INVENTION

1. Field of the Invention

This invention relates to an apparatus and method for estimating the binary error rate for a binary coded input data stream associated with a digital receiver (binary receiver). Such a receiver is employed in, e.g., satellite communication systems and in earth monitoring stations therefor.

2. Description of the Prior Art

Certain prior methods have been used to detect errors on digital signals. For example, U.S. Pat. No. 3,757,296 describes an error detection system for detecting actual errors in a partial response transmission system wherein separate level detectors are provided for positive and negative pulses so that when the magnitude of the signal voltage exceeds a predetermined maximum in either direction, an error signal is produced.

U.S. Pat. No. 3,248,695 discloses a binary signal error detection system in which in one embodiment error indication is provided each time a pulse amplitude is less than one-half of the signal data input or greater than twice the value of the signal voltage. The error detection system of this patent operates on a data stream having code characters of the parity check type.

U.S. Pat. No. 3,825,892 discloses an error detection system for a low disparity binary code (number of MARKS and SPACES is approximately equal) in which the low frequency component of the average signal value is an indication of signal error.

U.S. Pat. No. 3,721,959 teaches a system in which the error is defined as a forbidden window within an eye pattern with reference voltage height and reference time width.

U.S. Pat. Nos. 3,204,189 and 3,214,700 also disclose error detection systems.

None of the prior art estimates the BER by just measuring an event which is more than twice the amplitude and of the same polarity with respect to the normal signal voltage.

What is needed is a simple, accurate and economical circuit for estimating the bit error rate which functions independently of any particular bit pattern, which can be used for on-line monitoring without decreasing the information carrying capabilitiy of the link (e.g., the use of parity bits decreases said capability) and which accumulates a statistically significant sample in the same time as that required for a direct comparison between sent and received bits. These requirements are met by the present invention.

OBJECTS OF THE INVENTION

It is therefore a primary object of the present invention to provide an improved apparatus and method for estimating the binary error rate for a digital receiver.

It is a further object of the present invention to provide for an improved binary error rate estimator for use in a digital communication system.

It is an additional object of the present invention to provide for an improved, simple, accurate and inexpensive binary error estimator.

It is a further object of the present invention to provide for an improved binary error rate estimator which functions independently of any particular bit pattern.

It is a further object of the present invention to provide for an improved binary error rate estimator which can be used for on-line monitoring without decreasing the information carrying capability of the link.

It is an additional object of the present invention to provide for an improved binary error rate estimator in which the time required to accumulate a statistically significant sample is the same as that for a direct comparison between sent and received bits.

BRIEF DESCRIPTION OF THE DRAWINGS

These and other and more detailed and specific objects and features of the present invention are more fully disclosed in the following specification, reference being made to the accompanying drawings in which.

SUMMARY OF THE INVENTION

The present invention operates on the assumption that errors due to random noise in a binary receiver occur when the noise voltage at the decision point is larger in magnitude and opposite in sign to the signal voltage, since the receiver measures just the polarity (with respect to the midpoint reference voltage) and not its magnitude. For random noise, the number of instances in which the noise voltage is larger in magnitude and opposite in sign to the signal voltage is statistically equal to the number of instances in which the noise voltage is larger in magnitude and equal in sign to the signal voltage. Thus the number of instances in which the noise voltage is larger in magnitude and equal in sign to the signal voltage provides an accurate estimate of the bit error rate. Thus, a circuit can be devised which counts, on the one hand, the rate at which the combined signal plus noise voltage exceeds REF+2 V (where REF is the mean voltage around which the input signal is biased, V is the average maximum voltage above REF for a binary 1, and −V is the average minimum voltage below REF for a binary 0), and on the other hand, the rate at which the combined signal plus noise is less than REF−2 V. The sum of these two rates ("positive errors" plus "negative errors") provides a good approximation of the BER on the input data stream because these two events are mutually exclusive.

For a preferred embodiment, one further observation is needed. That is, assuming that over time the number of 1's on the input stream will be approximately equal to the number of 0's, the rate of "positive errors" is approximately equal to the rate of "negative errors." Thus, said preferred embodiment counts the rate at which the combined voltage of noise plus signal exceeds twice the normal signal (positive) peak voltage above reference (REF+2 V), and this becomes the estimate of one-half the BER. A comparing flip-flop produces a pulse if the sampled voltage is greater than REF+2 V, which indicates a "positive error." It was found during testing of this embodiment using a Hewlett Packard (HP) 3760A data generator, an HP 3761A error detector, and an HP 5245L pulse counter that twice the rate of these "positive errors" deviated from the normalized BER but little over an extended range of BER (more than six orders of magnitude).

Two comparators, a flip-flop, and an operational amplifier are used in a feedback loop to establish the reference voltage (REF) around which the input signal varies, and to establish the normal swing voltages (REF+V, REF-V) indicating a binary 1 and 0, respectively. Then the value 2 V is fed into the error-test flip-flop by a set of operational amplifier power supplies.

OPERATION OF THE PREFERRED EMBODIMENT

Figure 1:
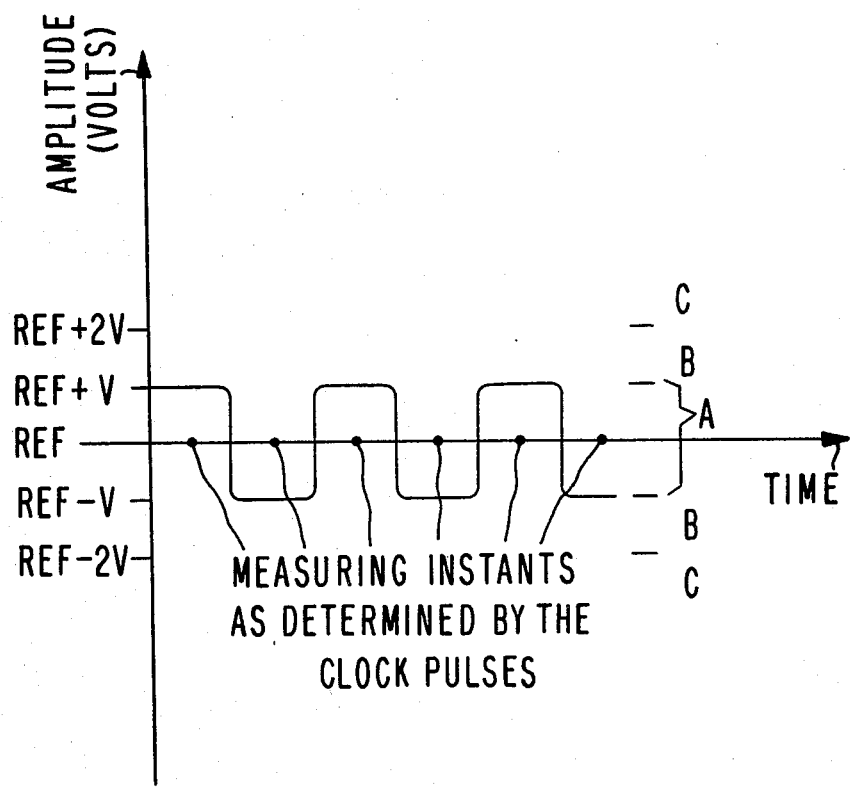
FIG. 1 is a wave diagram showing the ranges of operability of the invention.

Turning to FIG. 1, we see an input waveform of a typical signal which is to be received by the receiver. The X axis represents the time dimension and the Y axis represents the amplitude of the signal in volts. We see that the signal varies between REF+V and REF-V, representing a binary 1 and a binary 0, respectively. A pure undistorted square wave would have square corners when going from a binary 1 to a binary 0 state or vice versa, whereas in the drawing it is seen that these corners are rounded. This is due to the vagaries of propagation which this signal encounters as it streams through the atmosphere, cable, or other transmitting medium. It is to be noted, however, that this invention will work for any type of binary coded input waveform. The presence of noise voltage superimposed on the signal could take the amplitude to outer regions away from the signal envelope (which is labeled "A" in FIG. 1). Specifically, if the amplitude were between REF+V and REF+2 V or between REF-V and REF-2 V it would be in the "B" range as indicated in FIG. 1. This is a range which will not cause the production of an error signal by the present invention. However, if the noise is of sufficient strength so as to bring the amplitude of the signal (including the noise) to greater than REF+2 V, i.e., in the upper "C" range of FIG. 1, the device will cause an error signal to be generated. In said preferred embodiment, and where the number of 1's on the input is equal to the number of 0's over the testing interval, an upper "C" will occur as frequently as a lower "C" (i.e., combined amplitude less than REF-2 V), because the random nature of the noise makes it equally likely that a noise pulse will have a certain magnitude and polarity as it will have the same magnitude and opposite polarity.

Note that the circuit is timed by means of the incoming clock and the flip-flops 12, 13, and 29. This is a sampled system and only the voltages at the measuring instants (preferably one per input bit) will have any effect.

Figure 2:
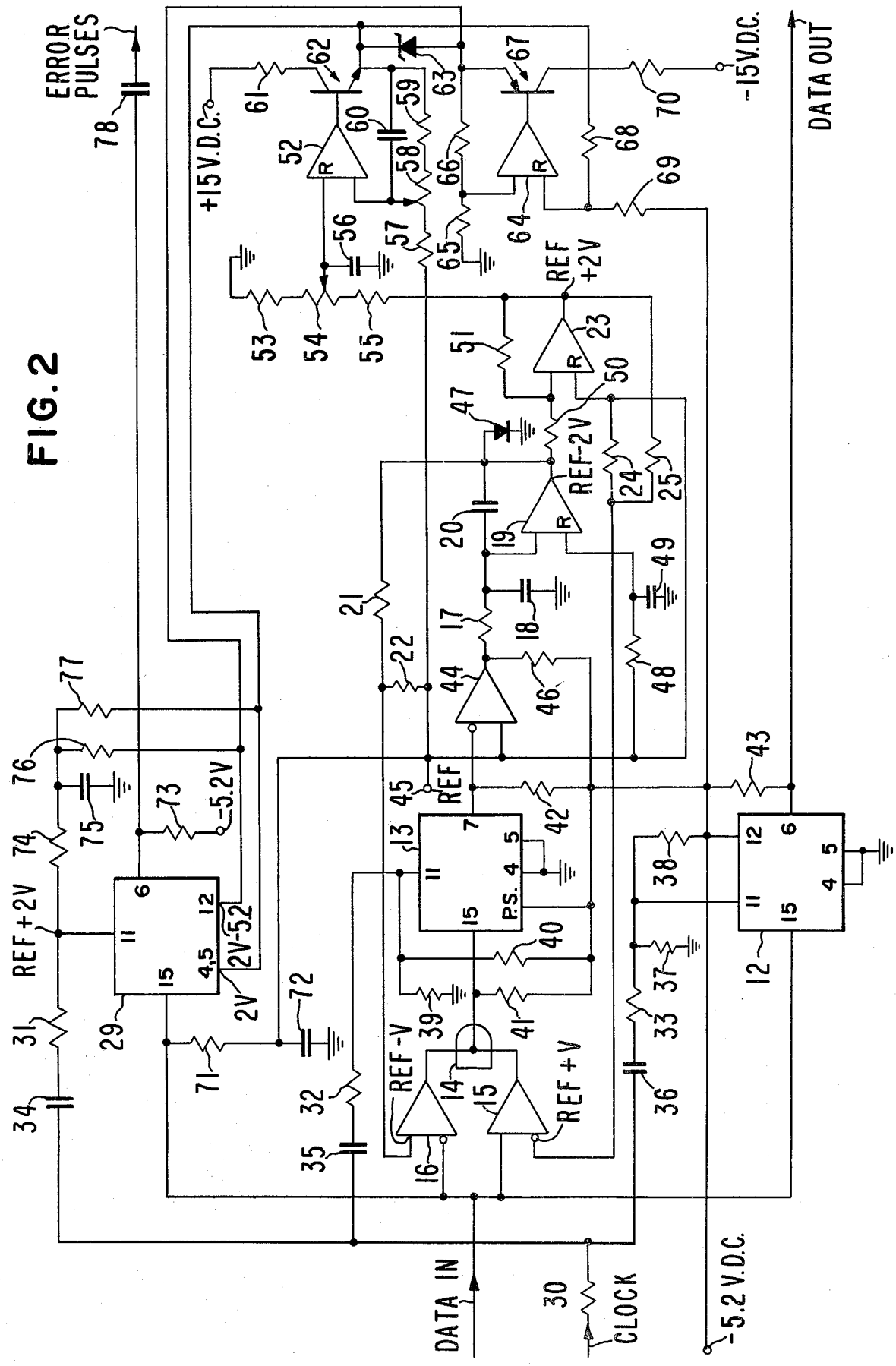
FIG. 2 is a circuit diagram disclosing the preferred embodiment of the present invention.

Turning to FIG. 2, we observe the circuit diagram of the preferred embodiment of the present invention.

In operation, the circuit works as follows: a signal is placed at the inputs to comparators 15 and 16. This initial signal is used by the servo loop (the major components of which are comparators 15 and 16, flip-flop 13, and operational amplifiers 19 and 23) to place reference signals of the same magnitude and opposite polarity (about reference voltage REF) on the inverting input terminal of comparator 15 and the non-inverting input terminal of comparator 16, respectively. As more input signals arrive at the input to these two comparators, additional feedback information is fed through the servo system which will result, in a short period of time (related to the time constant of filter circuit 17, 18, 20), in REF+V appearing at the inverting terminal of comparator 15 and REF-V appearing at the non-inverting terminal of comparator 16. The reason for this is that the noise signal, which is assumed to be random, will have no effect on the average maximum and minimum levels of the input signals, +V and -V, around REF. When these reference terminals are at these levels, a signal will be produced at the input terminal 15 of flip-flop 13 one-half the time. This is because each comparator operates on the principle that if the voltage at the non-inverting terminal is greater than that at the inverting terminal, then an output signal will be produced by said comparator, whereas if the voltage at the non-inverting terminal is less than that at the inverting terminal then no signal will be produced by said comparator. When the average positive sampled voltage of the input signal is equal to the voltage on the inverting terminal of comparator 15 and the average negative sampled voltage of the input signal is equal to the voltage at the non-inverting terminal of comparator 16, a positive signal appears at the output terminal of flip-flop 13 during one-half of the sampling instances. In this state, the servo loop is quiescent, i.e., the reference voltages for comparators 15 and 16 will not change.

After these reference values have been established on the reference terminals of comparators 15 and 16, the device is ready to count the errors. Because of the voltage divider 21, 22, the voltage at the output of operational amplifier (op amp) 19 will be REF-2 V and the voltage at the output terminal of op amp 23 will be REF+2 V. The REF voltage is removed by the power supply governed by op amp 52 and 2 V is fed to flip-flop 29 to serve as an internal decision point within that flip-flop, where the input signal is checked to see whether it is greater than REF+2 V. If it is, a signal will be produced at the output of flip-flop 29 indicating an error. These error signals will be outputted by flip-flop 29 a maximum of once per sampling interval, which is the period between clock pulses. The rate of these output signals is then approximately (because of the vagaries of the system) a number proportional to half the rate of actual errors in the input data stream. Potentiometers 54 and 58 are used to compensate for these vagaries.

Let us take some specific values to illustrate how the circuit operates. Let us assume that before the initialization phase, i.e., before op amp 19 reaches quiescense, the voltage at the inverting terminal of comparator 15 is REF+2 V and the voltage at the non-inverting terminal of comparator 16 is REF-2 V. Let us also assume that the first signal to hit the non-inverting terminal of comparator 15 and the inverting terminal of comparator 16 is REF+0.5 V. With these values neither of comparators 15 and 16 will produce an output signal; thus current gradually drains via op amp 19 as it discharges capacitor 20, lowering the voltage at the output of op amp 19 towards the common voltage point 45 (which sets itself at REF). This voltage is initially REF-4 V. When it reaches REF-2 V, REF+V is present at the reference (inverting) terminal of comparator 15 and REF-V at the reference (non-inverting) terminal of comparator 16. One-quarter of the time the input signal will be greater than REF+V. Thus, an output signal will be produced by comparator 15 one-quarter of the time. A mutually exclusive one-quarter of the time the input voltage will be less than REF-V. Thus, comparator 16 will produce an output signal one-quarter of the time. Thus, one-half the time an output signal will be produced by either of comparators 15 and 16 and will be fed via flip-flop 13 to op amp 19; and op amp 19 will be in a quiescent state. These reference voltages on comparators 15 and 16 will stay there for a relatively long period of time, i.e., at least several hundred bit periods, because of the smoothing action of filter 17, 18, 20. Thus, reference voltages of REF-2 V and REF+2

V will be quasi-permanently affixed to the output terminals of op amps 19 and 23, respectively.

DETAILED DESCRIPTION OF THE DRAWINGS

We now give a detailed description of FIG. 2, the circuit diagram. It is to be noted that all diodes on this circuit are of the type 1N4148 unless otherwise indicated. All op amps are 741's with pins 4 connected to −15 V DC and pins 7 connected to +15 V DC (power supply connections).

The DATA IN connection is connected to terminal 15 of flip-flop 29 which is a "D" flip-flop; to the inverting terminal of comparator 16; to the non-inverting terminal of comparator 15; and to terminal 15 of flip-flop 12, which is a "D" flip-flop. A "D" flip-flop such as flip-flop 12 works on the basis that the signal which is at the input terminal (terminal 15) will be transmitted to the output terminal (terminal 6) at the instant the state of the clock terminal (terminal 11) changes from a lower voltage to a higher voltage during a clock cycle. Thus it is seen that the function of flip-flop 12 is to clean the incoming signal by regularizing the frequency and the amplitude of that signal. The output (terminal 6) of flip-flop 12 is connected to the DATA OUT connection point and thence to the digital receiver or other recipient. Resistor 43, which is preferably a 270 ohm resistor, is used as a pull-down resistor to draw current from the final emitter of flip-flop 12 and is connected between the output terminal (terminal 6) of flip-flop 12 and an external −5.2 V DC power supply. This power supply connection is also connected to terminal 12, the DC power supply terminal, of flip-flop 12.

The CLOCK connection point generates a clock pulse which is preferably set to the same frequency as the input data stream coming in over the DATA IN terminal. This CLOCK wants to look at a 50 ohm impedance and therefore resistors 30, 31, 32 and 33, which are preferably each 25 ohms, constitute a four resistor voltage divider which sets the input impedance for the clock.

The input clock line passes through resistor 30 and then on the one hand passes through capacitor 34 and resistor 31 to the clock input terminal of flip-flop 29, which is a "D" flip-flop; on the other hand through capacitor 35 and resistor 32 to the clock terminal of flip-flop 13, which is a "D" flip-flop; and finally also through capacitor 36 and resistor 33 to the clock terminal of flip-flop 12. Capacitors 34, 35, and 36 are preferably 1,000 pf and their function is to act as direct current blocks.

It should be noted at this time that this circuit is designed to be wideband; it can handle a frequency from zero to about 300 MHz. This upper frequency is limited by the speed of the flip-flops. The circuit is primarily a high speed circuit, which can be noted from its ECL (emitter coupled logic) design.

From the configuration of the clock pulses entering the three flip-flops, it can be seen that they are designed to pulse at the same time and in cadence with the input data stream.

Resistor 37 is connected between the clock terminal of flip-flop 12 and ground and is preferably 68 ohms. It and resistor 38 are bias resistors and serve to elevate the input clock line at 50 ohms above ground. Bias resistor 38, which is connected between the clock terminal and the DC power supply terminal of flip-flop 12, is preferably 200 ohms. The circuit ground terminals, terminals 4 and 5, of flip-flop 12 are connected to ground.

Similarly, bias resistor 39 is connected between ground and the clock terminal of flip-flop 13 and is preferably 68 ohms. Bias resistor 40 is preferably connected between clock terminal 11 of flip-flop 13 and the power supply terminal of said flip-flop and is preferably 200 ohms.

Flip-flops 29, 13 and 12 are preferably of the type such as MC1670 manufactured by the Motorola Company. Comparators 15, 16 and 44 and voltage sensing point 45 can be on the same chip, such as MC1692 manufactured by the Motorola Company. Voltage sensing point 45 corresponds to the voltage on the non-inverting terminal of comparator 44. It sets itself to the midpoint of the voltage swings on the input signal. The voltage at this point is designated as REF and a typical voltage for this point in an ECL circuit is −1.3 volts.

The output terminals of comparators 15 and 16 are connected via wired OR-gate 14 to the input terminal (terminal 15) of flip-flop 13; therefore, whenever there is an output signal at either of comparators 15 or 16, or both, a signal will appear at the input of flip-flop 13. Resistor 41, which is preferably 150 ohms, is connected between the input terminal of flip-flop 13 and the power supply terminal of flip-flop 13. Its function is to draw current from the emitters of comparators 15 and 16. The two circuit ground terminals, terminals 4 and 5, of flip-flop 13 are connected to ground.

The output terminal, terminal 7, of flip-flop 13 is connected to the inverting terminal of comparator 44. The purpose of this comparator is to regulate the output voltage coming out of flip-flop 13 for insertion into the servo loop, the major components of which are comparators 15 and 16, flip-flop 13, and op amps 19 and 23. Pull-down resistor 42, which is preferably 300 ohms, is connected between the output terminal of flip-flops 13 and the common −5.2 volt DC power supply line, and also to the power supply terminal of flip-flop 13 and via pull-down resistor 46, which is preferably 300 ohms, to the output terminal of comparator 44.

The output terminal of comparator 44 is connected via resistor 17, which is preferably 2,000 ohms, to the non-reference terminal of op amp 19. Capacitor 18, which is preferably 0.1 micro farads, is connected between the non-reference terminal of op amp 19 and ground. Together, resistor 17 and capacitor 18 constitute a lowpass filter.

Capacitor 20, which is preferably 0.1 micro farads, is connected between the non-reference terminal of op amp 19 and the output terminal of said amplifier. Its purpose is to smooth the input on the op amp between the intervals of flip-flop 13. Diode 47 is connected as shown between the output terminal of op amp 19 and ground. Its purpose is to eliminate transient voltage spurs when turning on the system initially, thereby protecting the components of the circuit.

The output of op amp 19 is connected via resistor 21, which is preferably 1,000 ohms, to the non-inverting terminal of comparator 16. Resistor 22, which is preferably 1,000 ohms, is connected between the non-inverting terminal of comparator 16 and the common reference voltage point 45. Resistors 21 and 22, which are of the same value, together constitute a voltage divider such that the additional voltage above REF appearing on the output terminal of op amp 19 will be equal in sign and twice the amplitude of the additional voltage above REF appearing on the non-inverting terminal of comparator 16 (the reference terminal of this comparator).

The reference terminal of op amp 19 is connected via resistor 48, which is preferably 2,000 ohms, to the REF voltage 45. Capacitor 49, which is preferably 0.01 micro farads, is connected between the reference terminal of op amp 19 and ground. Together resistor 48 and capacitor 49 constitute a lowpass filter for applying filtered voltage at the reference terminal of op amp 19. The output of op amp 19 is connected via resistor 50, which is preferably 10,000 ohms, to the non-reference terminal of op amp 23. Resistor 51, which is the same value as resistor 50, i.e., preferably 10,000 ohms, is connected via the non-reference terminal of op amp 23 and the output terminal of said op amp. Together resistors 50 and 51 and op amp 23 constitute a unity gain inverting amplifier. Thus the voltage at the output of op amp 23 is equal in sign and opposite in polarity to the voltage at the output of op amp 19. In this case, said voltage at the output of op amp 23 is REF+2 V.

The output of op amp 23 is connected via resistor 25, which is preferably 1,000 ohms, to the inverting terminal of comparator 15. The reference terminal of op amp 23 is connected via resistor 24, which is preferably 1,000 ohms, to the inverting terminal of comparator 15. The non-inverting terminal of comparator 44 is also connected to REF voltage 45. Together resistors 24 and 25 constitute a voltage divider; since they are equal in value, the additional voltage above REF appearing on the inverting terminal of comparator 15 is equal in sign and one-half the magnitude of the additional voltage above REF appearing on the output terminal of op amp 23, i.e., the voltage appearing at the inverting terminal of comparator 15 is REF+V.

There is also a connection between the reference terminal of op amp 23 and common voltage point 45.

Op amps 52 and 64 control two power supplies, the function of which is to remove the REF voltage from the REF+2 V. The first power supply produces a voltage of 2 V which is applied at terminals 4 and 5 of flip-flop 29; the second power supply produces a voltage of 2 V−5.2 volts at the power supply terminal 12 of flip-flop 29. The REF voltage (typically −1.3 volts) is re-inserted internally by flip-flop 29, so that the input data stream voltage is tested against REF+2 V.

A connection is run between the output terminal of op amp 23 via resistor 55, which is preferably 10K ohms, and potentiometer 54, which is preferably a 10K pot, to the reference terminal of op amp 52. An additional resistor 53, which is preferably 10K ohms, is run between the 10K pot and ground. Capacitor 56, which is preferably 1 micro farad, is run between the reference terminal of op amp 52 and ground. A connection is run between the reference voltage point 45 via resistor 57, which is preferably 10K ohms, and pot 58, which is preferably 10K ohms, and the non-reference terminal of op amp 52. Capacitor 60, which is preferably 1 micro farad, is connected between the non-reference terminal of op amp 52 and the emitter of transistor 62 as shown. Transistor 62 is preferably an NPN transistor of the type 2N2222.

The output of op amp 52 is connected to the base of transistor 62. The collector of transistor 62 is connected via resistor 61, which is preferably a 200 ohm 1 watt resistor, to a +15 volt DC external source of voltage. An additional resistor 59, which is preferably 10K ohms, is connected between pot 58 and the emitter of transistor 62. The emitter of transistor 62 is connected as shown via Zener diode 63, which is preferably a 5.6 volt Zener diode, and terminal 12 of flip-flop 29. The purpose of Zener diode 63 is to suppress transients at the moment of turn-on to protect flip-flop 29. Terminal 12 of flip-flop 29 is also connected via resistor 66, which is preferably a 10K ohm resistor, to the non-reference terminal of op amp 64. Resistor 65, which is preferably a 10K ohm resistor, is connected between the non-reference terminal of op amp 64 and ground. The reference terminal of op amp 64 is connected via resistor 69, which is preferably a 10K ohm resistor, and the common supply line for the −5.2 volt DC power supply. Resistor 68, which is preferably a 10K ohm resistor, is connected between the reference terminal of op amp 64 and terminals 4 and 5 of flip-flop 29, and also to the emitter of transistor 62.

The output of op amp amp 64 is connected to the base of transistor 67, which is preferably a PNP transistor of the type 2N2907. The emitter of transistor 67 is connected to terminal 12 of flip-flop 29. The collector of transistor 67 is connected via resistor 70, which is preferably a 150 ohm one-half watt resistor, to a −15 volt DC external source of voltage. With this configuration, proper voltages are applied at terminals 4, 5 and 12 of flip-flop 29.

The output terminal (terminal 6) of flip-flop 29 is connected via capacitor 78 to the ERROR PULSES output connection and thence to a pulse counter (not shown). Capacitor 78 filters out the DC component from the output and therefore places pure alternating current at the ERROR PULSES connection point.

Pull-down resistor 73 is connected between the output terminal 6 of flip-flop 29 and the −5.2 volt DC external power supply connection.

The clock terminal of flip-flop 29 is connected via resistor 74, which is preferably 50 ohms, and capacitor 75, which is preferably 0.1 micro farads, to ground. The clock terminal of flip-flop 29 is also connected via resistor 74 and resistor 76, which is preferably 2K ohms, to terminal 12 of flip-flop 29. The clock terminal of flip-flop 29 is also connected via resistor 74 and resistor 77, which is preferably 680 ohms, to terminals 4 and 5 of flip-flop 29. Together the functioning of resistors 74, 76 and 77 and capacitor 75 is to insure that the impedance at the clock terminal of flip-flop 29 is 50 ohms and the voltage is REF+2 V.

The input terminal of flip-flop 29 is connected via resistor 71, which is preferably 50 ohms, and capacitor 72, which is preferably 10K pf, to ground. Resistor 71 is a matching resistor to give the correct impedance to the reference. Capacitor 72 is an AC shunt for the data signal. The end of capacitor 72 which is not connected to ground is connected to the reference voltage point 45.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. Apparatus for detecting the rate of error in an input binary coded data stream not including code characters of the parity check type, said apparatus comprising:
   means for generating a relative test voltage equal to approximately twice the average relative signal voltage of the data stream; and means connected to said generating means for producing an error pulse only whenever, at any one of many preselected sampling points clocked onto said producing means by clocking means connected thereto, the magnitude of the relative voltage of the data stream, including any noise superimposed thereon, exceeds the magnitude of said relative test voltage.

2. The apparatus of claim 1 wherein said clocking means establishes a series of sampling intervals of uniform duration equal to the average interval between pulses of the input data stream, with each said sampling point occurring at the end of a sampling interval.

3. The apparatus of claim 1 wherein the relative test voltage is positive and error pulses are produced only when the relative voltage of the data stream, including any noise superimposed thereon, exceeds said relative test voltage.

4. The apparatus of claim 1 further comprising an automatic gain control circuit (a.g.c.) connected to said generating means and to said input data stream, said a.g.c. setting two reference relative voltages, equal to the average relative maximum and the average relative minimum of the data stream voltage at the sampling points, respectively.

5. The apparatus of claim 4 wherein said automatic gain control circuit comprises two comparators, each having an inverting input terminal, a non-inverting input terminal and an output;
a first decision flip-flop whose input is connected via a wired OR-gate to the outputs of each of said comparators;
an operational amplifier whose non-reference input terminal is connected to the output terminal of said first flip-flop; and
at least one voltage divider connected to the output of said operational amplifier.

6. The apparatus of claim 5 further comprising a lowpass filter connected between the output terminal of said first flip-flop and the non-reference input terminal of said operational amplifier;
a unity gain inverting amplifier whose input is connected to the output of said operational amplifier;
a first voltage divider connected between the output terminal of said operational amplifier and the non-inverting terminal of said first comparator; and
a second voltage divider connected between the output terminal of said inverting amplifier and the inverting terminal of said second comparator.

7. The apparatus of claim 6 wherein said means for generating a relative test voltage comprises a power supply whose input is connected to the output of said inverting amplifier and whose output is connected to said means for producing error pulses.

8. The apparatus of claim 1 wherein said means for producing error pulses comprises a second decision flip-flop.

9. An apparatus for estimating the binary error rate on an input data stream of binary signals whose average maximum voltage, representing a binary "one," is $R+V$, and whose average minimum voltage, representing a binary "zero," is $R-V$, comprising:
a servo loop for establishing values of $R-V$ and $R+V$, respectively, including a first and second comparator, the input data stream being connected to the inverting terminal of said first comparator and to the non-inverting terminal of said second comparator;
a first decision flip-flop whose input is connected via a wired OR-gate to the outputs of each of said two comparators;
a lowpass filter whose input is connected to the output of said first flip-flop;
an operational amplifier whose non-reference input terminal is connected to the output of said lowpass filter and whose reference terminal is connected via a second lowpass filter to a point which is at voltage R;
a unity gain inverting amplifier whose input is connected to the output of said operational amplifier;
a first voltage divider which is connected between the output of said operational amplifier and the non-inverting terminal of said first comparator;
a second voltage divider which is connected between the reference terminal of said unity gain inverting amplifier and the inverting terminal of said second comparator;
a power supply whose input is connected to the output of said unity gain inverting amplifier and which removes the value R from the voltage at said terminal;
a second decision flip-flop, one power supply input terminal of which is connected to the output of said power supply and the data input terminal of which is connected to the input data stream;
wherein a clock input pulse set at approximately the same rate as the data rate of the input data stream is connected to the clock terminals of each of said first and second flip-flops.

10. A method for estimating the binary error rate of a binary coded data stream not including code characters of the parity check type, said method comprising:
establishing from the data stream itself the average maximum voltage deviation with respect to the normal baseline voltage of the input data stream;
doubling this average deviation to obtain a reference deviation; and
comparing the voltage deviation of the input data stream to this reference deviation at many predetermined sampling points.

11. The method of claim 10 wherein said comparing step produces an error pulse each time said data stream deviation exceeds said reference deviation at a sampling point.

12. The method of claim 10 wherein the intervals between sampling points are determined by a clock whose frequency is set at the same rate as the bit rate of the input data stream.

13. The method of claim 10 wherein said establishing step is performed by an automatic gain control circuit.

14. The method of claim 10 wherein said comparing is performed by a decision flip-flop.

15. The method of claim 10 further comprising the step of regenerating a clean output data stream from the input data stream for output to a digital recipient.

16. The method of claim 10 wherein said deviations are all positive.

* * * * *